(12) United States Patent
Fecker et al.

(10) Patent No.: US 9,691,093 B2
(45) Date of Patent: Jun. 27, 2017

(54) SYSTEM AND METHOD OF MATCHING A CONSUMER WITH A SALES REPRESENTATIVE

(71) Applicant: DealerDirect LLC, Dearborn, MI (US)

(72) Inventors: Marc Anthony Fecker, Dexter, MI (US); David Michael DiMeo, Northville, MI (US)

(73) Assignee: DEALERDIRECT LLC, Dearborn, MI (US)

( * ) Notice: Subject to any disclaimer, the term of this patent is extended or adjusted under 35 U.S.C. 154(b) by 5 days.

(21) Appl. No.: 14/943,869

(22) Filed: Nov. 17, 2015

(65) Prior Publication Data
US 2017/0140447 A1    May 18, 2017

(51) Int. Cl.
G06Q 30/00    (2012.01)
G06Q 30/06    (2012.01)
G06Q 50/00    (2012.01)

(52) U.S. Cl.
CPC ......... G06Q 30/0613 (2013.01); G06Q 50/01 (2013.01)

(58) Field of Classification Search
CPC ..................................................... G06Q 30/00
See application file for complete search history.

(56) References Cited

U.S. PATENT DOCUMENTS

| | | | | |
|---|---|---|---|---|
| 2004/0153368 A1* | 8/2004 | Freishtat | ................ | G06Q 30/06 705/26.41 |
| 2006/0218046 A1* | 9/2006 | Carfi | ..................... | G06Q 30/02 705/26.43 |
| 2010/0254527 A1* | 10/2010 | Addair | ................ | H04M 3/5233 379/265.12 |
| 2010/0312660 A1* | 12/2010 | Milgramm | ............. | G06Q 30/02 705/26.1 |
| 2012/0278176 A1* | 11/2012 | Naor | ................... | G06Q 30/0277 705/14.66 |
| 2013/0218865 A1* | 8/2013 | Angulo | ............. | G06F 17/30864 707/709 |

(Continued)

OTHER PUBLICATIONS

Informatica MDM for Sales, Marketing, and Customer Service. Executive Brief. Jun. 25, 2012 <https://www.informatica.com/content/dam/informatica-com/global/amer/us/collateral/executive-brief/mdm-sales-marketing-customer-service_ebook_2110.pdf>.*

*Primary Examiner* — Kathleen Palavecino
*Assistant Examiner* — Abby Flynn
(74) *Attorney, Agent, or Firm* — The Concept Law Group, P.A.; Scott D. Smiley; Yongae Jun

(57) ABSTRACT

A system and method is disclosed having at least one sensor operable to detect a presence of a consumer in a retail environment and at least one database storing personal information of the consumer and a plurality of sales representatives employed by the retail environment. The personal information includes at least one of a personality profile based on data from at least one social network system and text communications, photographic data, and video data on the social network system. A computing device is also provided that includes at least one processor and at least one network connection. The processor is operable to compare the personal information of the consumer with the personal information of each of the plurality of sales representatives and select one of the plurality of sales representatives to service the consumer based on the comparison.

8 Claims, 7 Drawing Sheets

(56) References Cited

U.S. PATENT DOCUMENTS

| | | | | |
|---|---|---|---|---|
| 2014/0100985 A1* | 4/2014 | Lenahan | ............ | G06Q 30/0605 |
| | | | | 705/26.4 |
| 2014/0244335 A1* | 8/2014 | Baldwin | ........ | G06Q 10/063118 |
| | | | | 705/7.17 |
| 2014/0372372 A1* | 12/2014 | Schlomka | ......... | G06F 17/30029 |
| | | | | 707/609 |
| 2015/0139416 A1* | 5/2015 | Skiba | .................. | H04M 3/5233 |
| | | | | 379/265.12 |
| 2016/0380954 A1* | 12/2016 | Dugan | .................... | H04L 51/32 |
| | | | | 709/206 |

* cited by examiner

104

108

Personal Information of Customer

500

Personal Information of Sales Rep.

JosephJackson@gmail.com
Picking up my dog from doggy daycare.

502

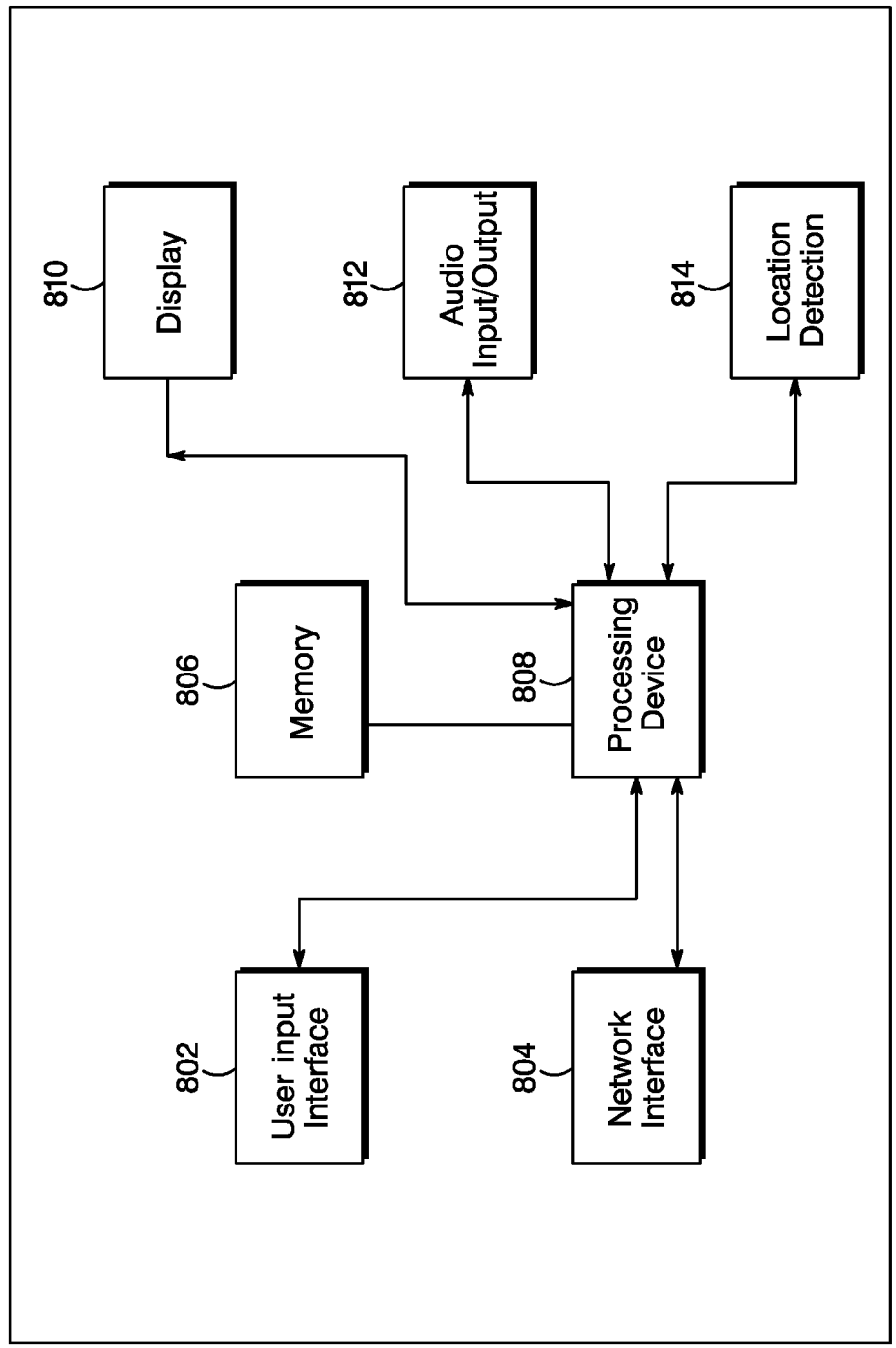

SYSTEM AND METHOD OF MATCHING A CONSUMER WITH A SALES REPRESENTATIVE

FIELD OF THE INVENTION

The present invention relates generally to improving a consumer experience within a retail environment, and, more particularly, relates to a system and method of matching a consumer with a sales representative based on a comparison of personal information gathered from collateral sources and analyzed by a computing device.

BACKGROUND OF THE INVENTION

It is well-known that sales representatives often rely on establishing a personal connection with a consumer in order to more effectively persuade the consumer to purchase an item for sale. Establishing this personal connection can assist the consumer with trusting the sales representative. Otherwise, the consumer may not consider the sales representative's advice or guidance when deciding whether and what to purchase. This is especially the case where the consumer may be in the market to purchase a high priced item, such as electronics, furniture, a vehicle, or a home. Deciding whether and what to purchase can include many considerations that the sales representative can assist with in order to help the consumer make an informed purchase. However, the consumer will not regard the sales representative's advice if: 1) he or she does not trust the sales representative, or 2) does not find the information he/she is providing relatable. In addition, gaining the consumer's trust and confidence leads to a higher likelihood that the consumer will become a repeat customer and recommend the retail establishment to other consumers.

It is also known that establishing a rapport with a consumer can assist a sales representative with the consumer. Building a rapport includes highlighting common interests or activities and establishing a mutual feeling of friendliness. Creating a friendly social environment within the retail environment can enhance the consumer's retail experience and increase the likelihood of a purchase, as well as repeat purchases within the same retail environment. If the consumer associates a retail experience with positive feelings, the consumer is more likely to return and recommend the retail establishment to others. Unfortunately, building a rapport can be very difficult because some consumers are inherently prone to distrusting sales people as having a self-interest, which places consumers on the defensive. Also, it is difficult to quickly identify a common interest or experience in a retail environment where there is very limited information readily available to the sales representative about the consumer.

One known method of establishing a rapport with a consumer is to mimic the customer's body language, communication style, and mannerisms. This is also known as mirroring the consumer. It allows the consumer to feel more comfortable with the sales representative because people generally feel more comfortable around other like individuals. Unfortunately, mirroring may not be enough to overcome a consumer's initial distrust of sales people in general and/or other negative impressions that the consumer may have of the sales representative based on a first impression. Also, mirroring is more effective in person and is difficult to establish via electronic communications.

Another known method of establishing rapport with consumers is to stay informed with current events. The hope is that the sales representative may discuss current events as a way to establish rapport through social conversation. Unfortunately, the consumer may not be aware of the current events or may be uninterested in the current event. Existing methods of establishing rapport with consumers do not provide a quick and convenient method of learning specific information about a particular consumer that is more personal and relevant to the consumer. Establishing a rapport is best accomplished within the first few minutes of an initial meeting according to some sales experts.

There are generally two broad categories of retail environments: physical retail establishments (also referred to as "brick-and-mortar" retail establishments) and e-commerce websites that trade products or services over computer networks, such as the Internet. With the growing popularity of e-commerce, brick-and-mortar retail establishments have been quickly losing sales to Internet e-commerce websites. Many consumers prefer to purchase items over the Internet because of the convenience of being able to purchase at any time and from virtually anywhere. Accordingly, brick-and-mortar retail establishments are currently searching for new ways of enhancing the consumer experience therein to bring in new customers and retain the old.

On the other hand, Internet e-commerce websites have their drawbacks, as well. In particular, establishing a personal rapport with a consumer via an e-commerce website is difficult, if not impossible, because of the lack of personal interactivity between most retail websites and the consumer. Some consumers enjoy a more personal retail experience. Accordingly, existing e-commerce websites possess an Internet-centric problem of providing an impersonal retail environment. It is well-known that the Internet provides a measure of emotional distance between people because of the lack of physical presence, which makes most Internet e-commerce websites an inherently impersonal environment for conducting business.

In addition, retail establishments often employ several sales representatives. There is usually no established method or system of matching a sales representative to a consumer. Typically, the first sales representative to see and approach the consumer is informally paired with the consumer, regardless of whether that sales representative is the best match for the consumer. This can provide an unsatisfactory consumer experience. For example, a sales representative with no children may not be the most appropriate sales representative to understand the vehicular needs of a large family looking to purchase a minivan. Existing retail environments do not provide a more targeted method of ensuring that the consumer is paired with the most compatible sales representative, or with a sales representative having a common interest with the consumer.

One prior art system identifies an appropriate sales professional who possesses a sales record of best obtaining sales from customers with the mood or an emotional state demonstrated by the consumer's facial expressions within the retail environment. However, keeping a record of sales representatives' customers and their mood or emotional state at the time of the sale is very cumbersome and inconvenient. The system is also prone to inaccuracies, because a consumer's facial expression, mood, and emotional state can change many times throughout a purchasing experience. Moreover, the prior art system does not provide personal information to the sales representative that would assist the sales representative with building a rapport with the consumer over a shared interest or characteristic.

Therefore, a need exists to overcome the problems with the prior art as discussed above.

SUMMARY OF THE INVENTION

The invention provides a system and method of matching a consumer with a sales representative that overcomes the hereinafore-mentioned disadvantages of the heretofore-known devices and methods of this general type.

With the foregoing and other objects in view, there is provided, in accordance with the invention, a hardware system operable to automatically match a consumer with a sales representative, the hardware system including a brick and mortar retail establishment having an entrance; an image capturing device facing the entrance to the brick and mortar retail establishment; and a processor communicatively coupled to the image capturing device. The processor is operable to receive, from the image capturing device, an image of a consumer at the brick and mortar retail establishment; identify at least one attribute of the consumer from the image; compare the at least one identified attribute of the consumer with personal information of a plurality of sales representatives employed by the brick-and-mortar retail establishment; and cause an electronic notification device to inform one of the plurality of sales representatives they were selected as a result of the step of comparing the at least one identified attribute of the consumer with the personal information of the plurality of sales representatives.

In accordance with another feature of the present invention, the attribute is at least one of: race; age; sex; family members accompanying the consumer; and a handicap of the consumer.

In accordance with a further feature, an embodiment of the present invention further includes a network interface communicatively coupled to the processor and wherein the processor is further operable to: compare the image of the consumer to images accessible via the network interface; identify the consumer from the image comparison step; gather personal information, via the network interface, associated with the identified consumer; and define the attribute based on the gathered personal information.

In accordance with a further feature of the present invention, the step of comparing the image includes comparing the captured image to images of people accessible via the world wide web.

In accordance another feature of the present invention, the step of comparing the image includes comparing the captured image to images of people found on social media sites.

In accordance with yet another feature, the attribute is at least one of: the consumer's educational background; an activity the consumer has participated in; the consumer's family status; and previous purchases made by the consumer.

In accordance with a further feature, the attribute is a detailed history of previous website visits of the consumer.

In accordance with another feature, an embodiment of the present invention also includes providing a computing system having at least one processor and at least one network connection, the computing system communicatively coupled to at least one database and at least one sensor. The at least one sensor detects a presence of a consumer in a retail environment. As a result of the at least one sensor detecting the presence of the consumer within the retail environment, the at least one processor comparing personal information of the detected consumer with personal information of a plurality of sales representatives employed by a brick-and-mortar retail establishment associated with the retail environment. The personal information of the detected consumer and the plurality of sales representatives is stored on the at least one database and includes at least one of: text communications within at least one social network system, photographic data from photographs on the at least one social network system, video data from videos on the at least one social network system, and combinations thereof. The at least one processor selects one of the plurality of sales representatives to serve the consumer based on the comparing step.

In accordance with yet another feature, an embodiment of the present invention includes automatically communicating, by the computing system, via the at least one network connection, to an electronic device associated with the selected sales representatives an indication of the detected consumer.

In accordance with a further feature of the present invention, the retail environment is a website associated with the brick-and-mortar retail establishment and hosted by a server communicatively coupled to the computing system; and as a result of the server detecting the presence of the consumer at the website, the server causes the website to display a chat window on a remote electronic device of the consumer, the chat window configured to allow the detected consumer and the selected sales representative to chat over the Internet in real-time.

In accordance with yet a further feature of the present invention, the chat window displays a photograph of the selected sales representative to the consumer.

In accordance with another feature of the present invention, the retail environment is the brick-and-mortar retail establishment; the at least one sensor includes a camera and a processor, the camera physically present at the brick-and-mortar retail establishment and the processor operably configured to receive visual images captured by the camera, and analyze the visual images to determine if the visual images includes an image of a consumer physically present at the brick-and-mortar retail establishment; and the at least one processor performs the comparing step as a result of the at least one sensor determining that the visual images includes an image of the consumer physically present at the brick-and-mortar retail establishment.

In accordance with another feature, an embodiment of the present invention automatically communicates, by the computing system, via the at least one network connection, to an electronic device associated with the selected sales representatives the personal information of the detected consumer that is in common with the personal information of the selected sales representative.

In accordance with another feature of the present invention, the computing system creates a personality profile based on the personal information from the at least one social network system.

In accordance with yet another feature of the present invention, the personal information of the consumer is the photographic data of the consumer stored on the at least one social network system, and the at least one processor is operably configured to analyze the photographic data of the consumer and determine at least one of an interest and an activity of the consumer from the photographic data; and perform the selecting step by identifying at least one common interest or common activity between the consumer and at least one of the plurality of sales representatives.

In accordance with a further feature of the present invention, the personal information of the consumer is the video data of the consumer stored on the at least one social network system; and the at least one processor is operably configured to analyze the video data of the consumer and determine at least one of an interest or activity of the consumer from the video data; and perform the selecting step by identifying at least one common interest or common activity between the consumer and at least one of the plurality of sales representatives.

In accordance with yet a further feature of the present invention, the personal information of the consumer is the text communications of the consumer within the at least one social network system; and the at least one processor is operably configured to analyze the text communications of the consumer and determine at least one of an interest or an activity of the consumer from the text communications; and perform the selecting step by identifying at least one common interest or common activity between the consumer and at least one of the plurality of sales representatives.

In accordance with another feature of the present invention, the personal information stored on the at least one database includes demographics of the consumer and the plurality of sales representatives.

In accordance with yet another feature, an embodiment of the present invention includes analyzing, by the at least one processor, the personal information of the consumer stored on the at least one database; based on the analysis, the at least one processor, determining at least one of an interest or activity of the consumer from said personal information; identifying at least one common interest or common activity between the consumer and at least one of the plurality of sales representatives; and creating a ranking list, by the at least one processor, the ranking list ranking each of the plurality of sales representatives based on the identification of the at least one common interest or common activity between the consumer and the plurality of sales representatives; and selecting a highest ranking sales representative from the ranking list to serve the consumer.

In accordance with yet another feature of the present invention, the computing system further includes a web scrapper operably configured to gather data associated with the consumer and the plurality of sales representatives and populate the at least one database with the data, wherein the data is from the at least one social network and corresponds to the personal information of the consumer and the plurality of sales representatives that is used to select the one of the plurality of sales representatives to serve the consumer.

Although the invention is illustrated and described herein as embodied in a system and method of matching a consumer with a sales representative, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 8 is a block diagram of an exemplary mobile electronic device in accordance with the present invention.

DETAILED DESCRIPTION

Figure 1:
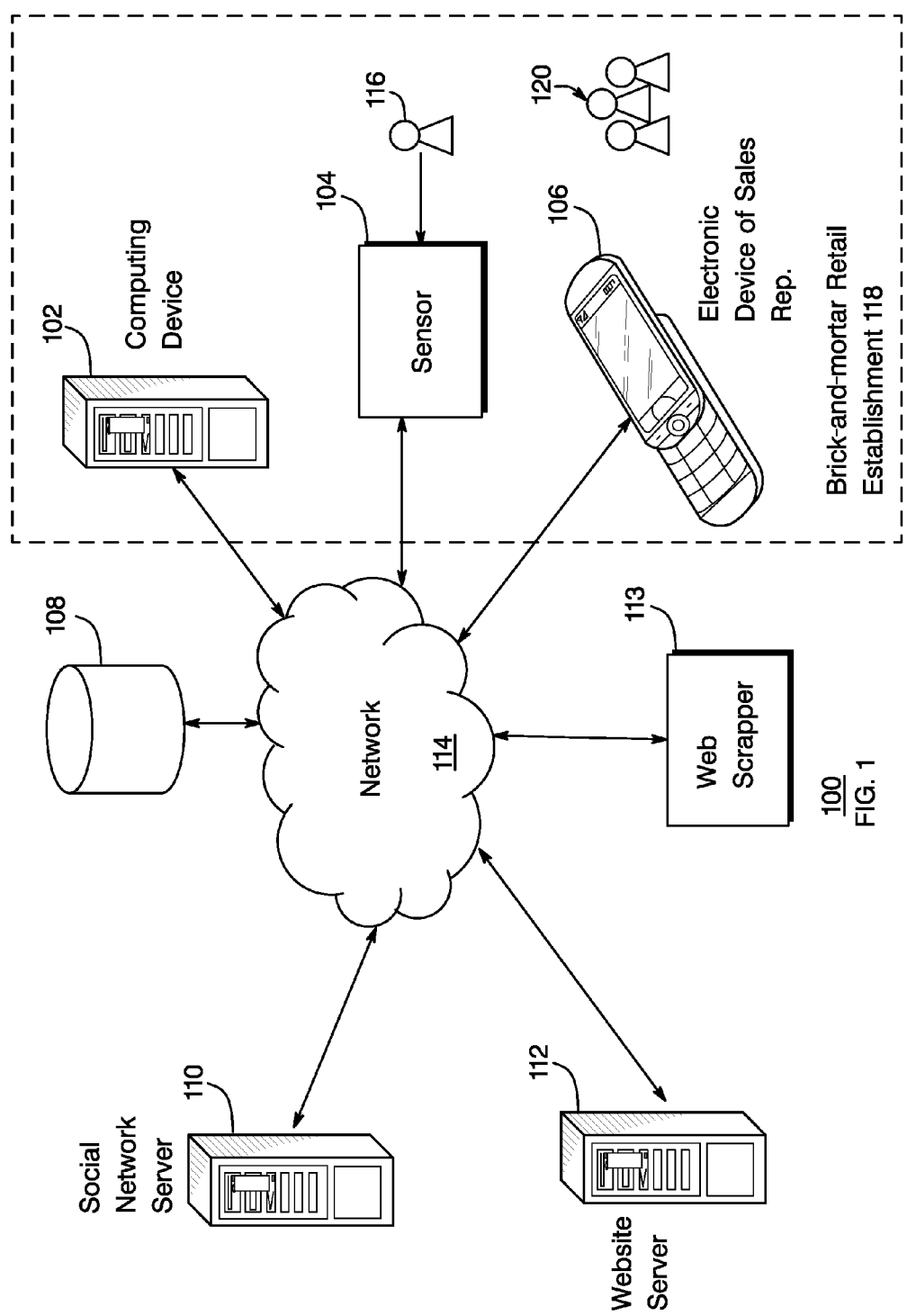
FIG. 1 is a block diagram of an exemplary distributed data processing network with a computing device, a sensor, an electronic device, a web scrapper, a social network server, a website server, and databases in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system and method of matching a consumer with a sales representative. Embodiments of the invention provide a system with a sensor that detects the presence of a consumer within a retail environment, such as a brick-and-mortar establishment or an e-commerce website. In addition, embodiments of the invention provide a database that stores personal information of the consumer and the sales representatives employed by the retail environment. The personal information includes data gathered by a web scrapper from one or more social networks. The data can include photographs, video, text communications, and other related data or meta data obtained by the web scrapper on the social network systems. In some embodiments, a processing device compares the personal information of the consumer with the personal information of each of the sales representatives and selects the sales representative with at least one common interest, characteristic, experience, trait, or the like. In a further embodiment, the sales representative receives a message indicating the consumer and including the personal information that the sales representative has in common with the consumer. In yet a further embodiment, the processing device analyzes the personal information and creates a ranked list in which each sales representative is ranked based on the number or nature of commonalities with the consumer. The system may select the sales representative with the highest ranking in the ranked list.

Referring now to FIG. 1, one embodiment of the present invention is shown as a block diagram, illustrating an exemplary distributed data processing network in accordance with the present invention. FIG. 1 shows several advantageous features of the present invention, but, as will be described below, the invention can be provided in several shapes, sizes, combinations of features and components, and varying numbers and functions of the components. The first example of a retail experience enhancing system 100, as shown in FIG. 1, includes a computing device 102, a sensor 104, an electronic device 106, a database 108, a social network server 110, a website server 112, and a web scrapper 113, communicatively coupled over at least one network 114.

Figure 2:
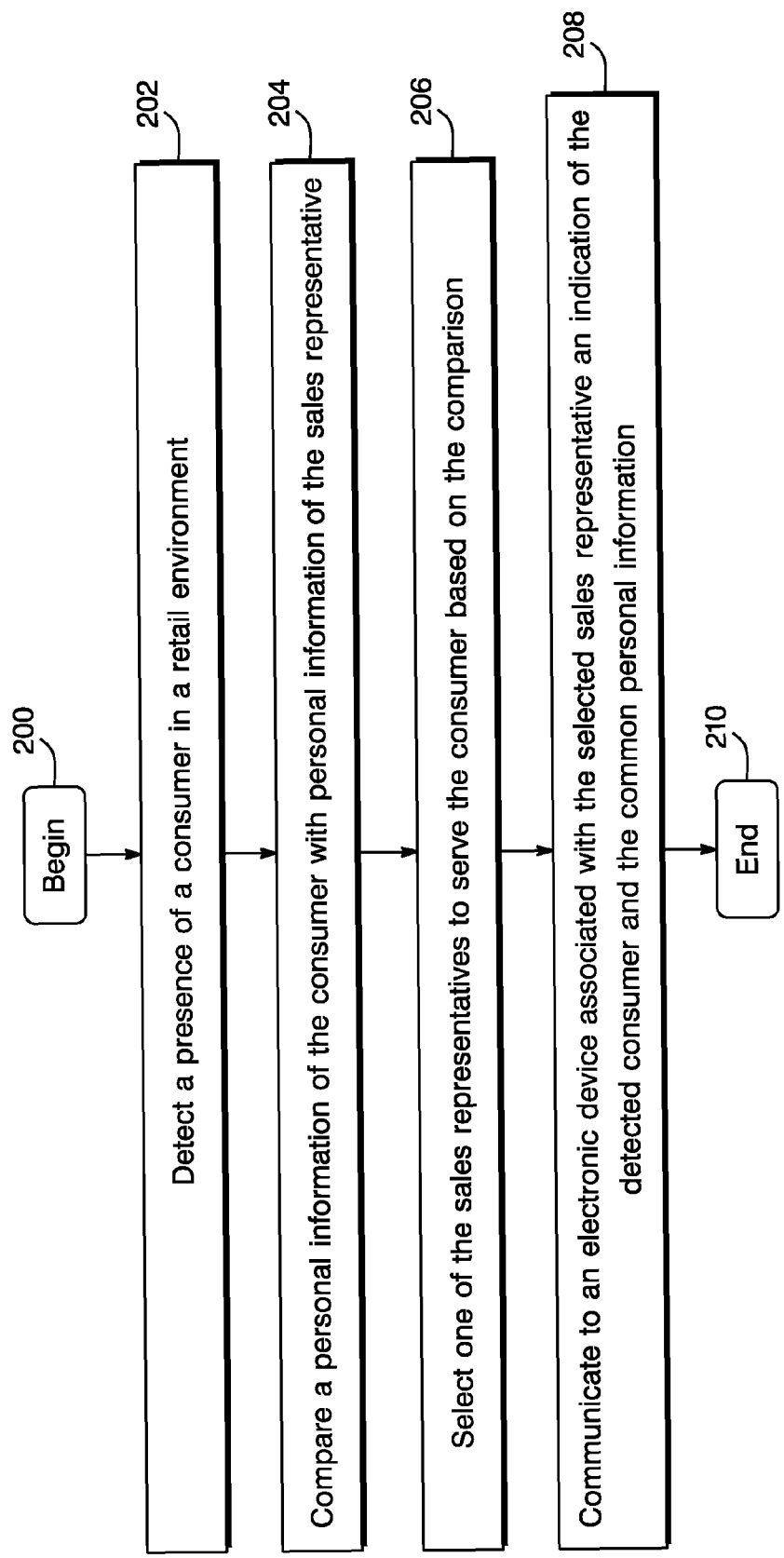
FIG. 2 is a process flow chart representing an exemplary method of enhancing a consumer's experience in accordance with the present invention.

FIG. 1 will be described in conjunction with the process flow chart of FIG. 2. Although FIG. 2 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 2 for the sake of brevity. In some embodiments, some or all of the process steps included in FIG. 2 can be combined into a single process.

The process of FIG. 2 begins at step 200 and moves directly to step 202, where the sensor 104 detects a presence of a consumer 116 in a retail environment. In one embodiment, the sensor 104 is communicatively coupled to the computing device 102 over the network 114. The network 114 can include the Internet, which represents a worldwide collection of networks and gateways that uses the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network 114 also may be implemented as a number of different types of networks, such as for example, an Intranet, a local area network (LAN), or another wide area network (WAN), such as a cellular network. The network 114 may also include additional servers and other devices and entities not shown. FIG. 1 is intended as an example, and not as an architectural limitation for the present invention.

The term "sensor" is used herein in a broad sense and is intended to indicate a device or computing system that is operable to detect the consumer's 116 presence within a retail environment, where the presence can be a physical presence (as with a brick-and-mortar store) or a "virtual" presence (as with an e-commerce website). In other words, the "presence" detected by the sensor 104 is intended to encompass the consumer 116 visiting an e-commerce website via the Internet, as well as, a physical presence of the consumer 116 within a brick-and-mortar retail establishment 118.

Figure 3:
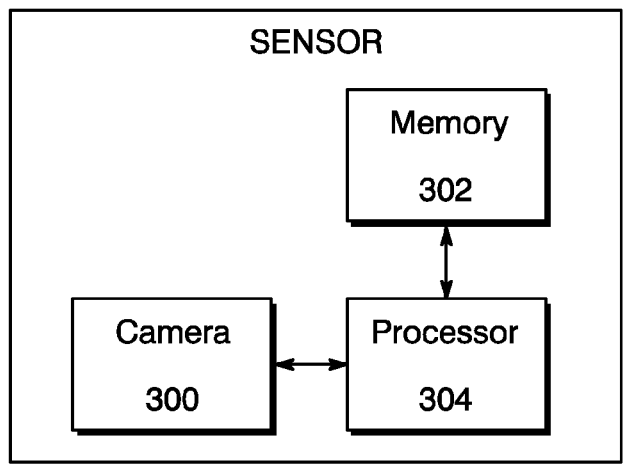
FIG. 3 is a block diagram view of an exemplary sensor in accordance with an embodiment of the present invention.

FIG. 3 shows an exemplary embodiment of the sensor 104 in a block diagram view. In the exemplary embodiment depicted in FIG. 3, the sensor 104 includes a camera 300, memory 302, and a processor 304 that are communicatively coupled to one another. The camera 300 can be considered an image capturing device. In one embodiment, the camera 300 can be configured to capture still images, such as, photographs. In another embodiment, the camera 300 can be a video camera operable to capture moving images, such as, video. The camera 300 is preferably disposed within the brick-and-mortar retail establishment 118 in a location with high consumer traffic, such as, an entrance to the brick-and-mortar retail establishment 118. The camera 300 may be positioned to face the entrance to the brick-and-mortar retail establishment 118. In other embodiments, the camera 300 can be disposed in other locations within the brick-and-mortar retail establishment 118. In one embodiment, visual images captured by the camera 104 are stored in the memory 302. The memory 302 may be, for example, one or more registers, a buffer, or non-volatile memory. The memory 302 may also include non-volatile storage. The non-volatile storage may represent any suitable storage medium, such as a hard disk drive or non-volatile memory, such as flash memory. The memory 302 may also store computer instructions that are carried out by the processor 304, such as, for example, a software application or other computer instructions. In one embodiment, the processor 304 is configured to execute computer instructions to receive visual images captured by the camera 300 and analyze the visual images to determine if the visual images include an image of a consumer 116 physically present at the brick-and-mortar retail establishment 118. The sensor's 104 detection of the consumer's 116 presence may prompt the next step in the inventive process, such as obtaining the consumer's 116 personal information and comparing said personal information with that of the plurality of sales representatives 120. In a preferred embodiment, the personal information is compared in real-time immediately after the sensor's 104 detection of the consumer 116, so that a compatible sales representative 120 can be quickly selected in real-time before a noncompatible sales representative 120 approaches the consumer 116.

In another embodiment, the processor 304 is configured to execute computer instructions to analyze the visual images to identify at least one visually detectable attribute of the consumer 116. For example, the processor 304 may determine whether the visual images include more than one person. Further, the processor 304 may determine if at least one of the multiple persons detected by the camera 300 is a child. Accordingly, the processor 304 may determine that the customer 116 is a parent and, as a result, a sales representative 120 who is also a parent may be selected to serve the customer 116. In other embodiments, the attribute may be race, age, sex, a handicap, personal style, obtainable interests, or the like.

Referring again primarily to FIGS. 1 and 2, the sensor 104 can, in some embodiments, be the website server 112 that can detect when the consumer 116 is visiting an e-commerce website hosted by said server 112. The website server 112 receives, processes, and responds to client requests for information and/or data, which is typically presented in the form of web pages displayed on a client device via a web browser operating on the client device. Web pages may consist of files of static text stored within a server's file system (static web pages), or the web server may construct the (X)HTML for each web page when it is requested by a browser (dynamic web pages). Client-side scripting can make web pages more responsive to user input once in the client browser. Web pages are requested and served from web servers using Hypertext Transfer Protocol (HTTP). This information is usually in HTML or XHTML format, and may provide navigation to other web pages via hypertext links within the page. The web pages may also be used in combination with any kind of extensible markup language (XML) document, including plain XML, scalable vector graphics (SVG), and XML user interface language (XUL).

In a preferred embodiment, the e-commerce website is associated with the brick-and-mortar establishment 118. For example, if the brick-and-mortar establishment 118 is an automobile dealership, the e-commerce website may be a website that is associated with the automobile dealership. Accordingly, the consumer's 116 experience can be enhanced by the retail experience enhancing system 100 via the retailer's website, as well as, the physical store. In yet another embodiment, the sensor 104 can be considered a client computer operating the web browser that displays the e-commerce website. The client computer may be operable to detect when the consumer 116 is visiting the e-commerce website. In such "virtual presence" embodiments, the "retail environment" is the e-commerce website. As used herein, the term "retail environment" is intended to indicate an environment in which consumers may purchase goods and/or services. Further, the term "retail environment" is intended to encompass either or both of a physical environment and a computer interface.

In step 204, personal information of the consumer 116 is compared with personal information of the plurality of sales representatives 120 to, for example, identify a commonality between the consumer 116 and at least one of the plurality of sales representatives 120. Accordingly, the identified sales representative 120 can utilize said commonality in order to establish a rapport with the consumer 116 for enhancing the personal quality of the consumer's 116 retail experience. In one embodiment, the personal information of the consumer 116 is compared with the personal information of the plurality of sales representatives 120 in real-time as a result of the sensor 104 detecting the consumer's 116 presence within the retail environment. Said detection of the consumer 116 within the retail environment may be implemented by, for example, the camera system depicted in FIG. 3 detecting the consumer 116 at the brick-and-mortar retail establishment 118, or the website server 112 detecting that the consumer 116 is visiting the e-commerce website that it hosts. In another embodiment, the personal information may be shared as a result of another step in the inventive process.

The plurality of sales representatives 120 may be employed by the owner of the brick-and-mortar retail establishment 118, or may be contractors in some embodiments. As used herein, the term "sales representative" is intended to indicate an individual who is tasked to assist consumers within a retail environment. In one embodiment, the sales representatives 120 may be located at the brick-and-mortar retail establishment 118. In another embodiment, the sales representatives 120 may be located at a central call center to process customer service requests remotely, such as, for example, via the Internet or over the telephone.

In one embodiment, the computing device 102 is configured to compare the personal information of the consumer 116 and sales representatives 120. For example, the computing device 102 may include the software application that performs the comparison and analysis of personal information stored on the database 108. In another embodiment, said software application may be implemented over more than one computing device 102 in a cloud-computing system. In one embodiment, the computing device 102 may be located at the brick-and-mortar establishment 118. In another embodiment, the computing device 102 may be located remotely from the brick-and-mortar retail establishment 118.

Similarly, the database 108 may be located at the brick-and-mortar establishment 118, or remotely therefrom on, for example, a cloud-computing system. In one embodiment, the database 108 may be non-volatile storage within the computing device 102. In another embodiment, the database 108 may be a separate storage component from the computing device 102, as illustrated in the exemplary embodiment depicted in FIG. 1. In yet another embodiment, the database 108 may be formed as other types of non-volatile memory, such as flash memory.

In one embodiment, the database 108 stores the personal information of the consumer 116. In a further embodiment, the database 108 also stores the personal information of the plurality of sales representatives 120 employed by the retail environment. As used herein, the term "personal information" is intended to indicate data corresponding to a particular person or individual rather than to anyone else.

Figure 4:
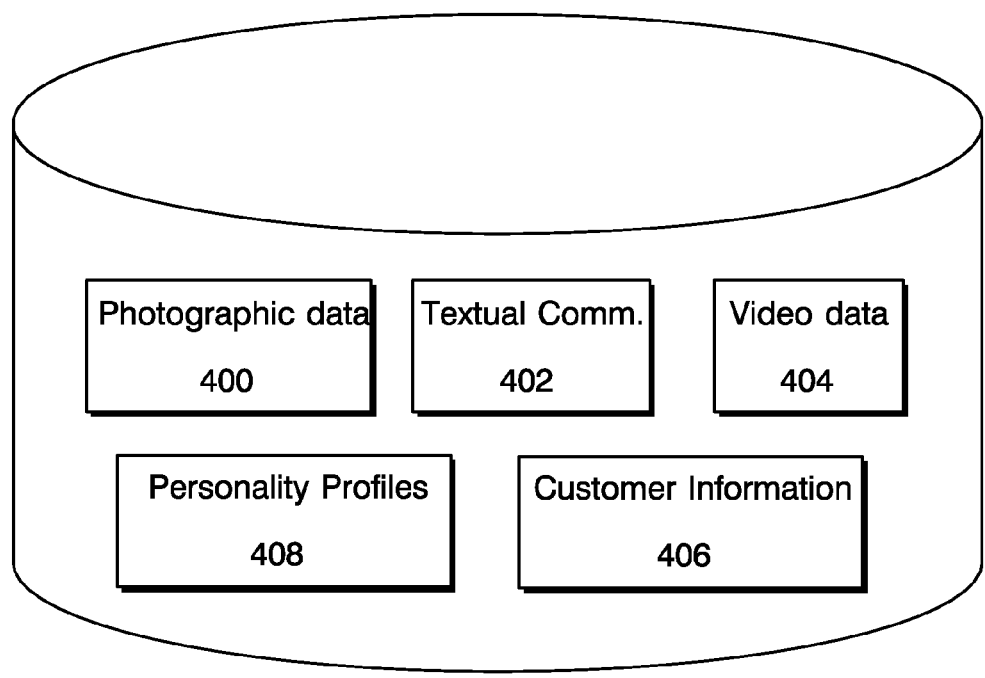
FIG. 4 is a block diagram view of an exemplary database in accordance with an embodiment of the present invention.

FIG. 4 shows an exemplary embodiment of the database 108 in a block diagram view. In the exemplary embodiment depicted in FIG. 4, the database 108 stores personal information in the form of photographic data 400, textual communications 402, video data 404, customer information 406, and personality profiles 408. The customer information 406 can include, for example, biographical information about the customer or customer transactional information (e.g., previous purchase information). In one embodiment, the photographic data 400, textual communications 402, and video data 404 are gathered from the social network server 110. In a further embodiment, the personality profiles 408 of the consumer 116 and the sales representatives 120 are determined based on data gathered from the social network server 110. In yet a further embodiment, the customer information 406 may include customer information specifically corresponding to customer records associated with the retail establishment, such as, for example, a customer name, telephone number, physical and email address, previous purchases, and the like. For example, the customer information 406 may indicate one or more previous vehicles purchased by the consumer 116 (where the retail environment is a vehicle dealership). Accordingly, the system 100 may attempt to identify a sales representative 120 who, for example, has purchased the same or similar vehicle personally.

Social networking websites have gained increasing popularity. Accordingly, a large amount of personal information, such as audio, video, and image files and textual communications or posts can be found on social network systems. In fact, most consumers belong to at least one or more social networks on the Internet. Embodiments of the present invention, utilize the massive amount of digital information that can be found on social network systems in order to enhance the consumer retail experience. Personal information found on social networking sites or otherwise on the Internet can be used to identify attributes of the consumer 116 and/or the sales representative 120 such as educational background, family status, activities, previous purchase history, a history of previous websites visited, etc.

In one embodiment, photographic data 400 can include digital photographs posted on the consumer's 116 and sales representative's 120 social network accounts. In another embodiment, the photographic data 400 can include meta data associated with the digital photographs, such as, for example, geo-location at which the photograph was taken, individuals tagged in said digital photograph, time and date that said photograph was taken, and the like. In yet a further embodiment, the photographic data 400 can include results of an analysis performed on said photograph that identifies, for example, the content of the photograph and determines an interest or activity of the consumer 116 based on the content.

Figure 5:
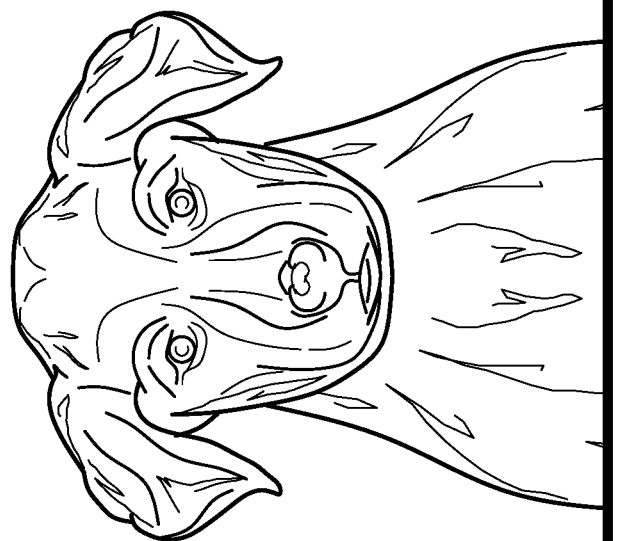
FIG. 5 is a front view illustrating personal information of a consumer and a sales representative that are compared in accordance with an embodiment of the present invention.
Figure 5:
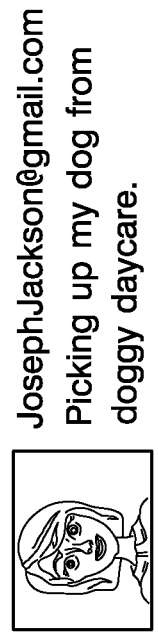

For example, in FIG. 5, the photographic data 400 includes a photograph 500 of the consumer's 116 dog, which may have been posted on the consumer's 116 Facebook page, subsequently obtained by the web scrapper 113, and then stored on the database 108. Accordingly, the system 100 may determine that the consumer 116 possesses an interest in dogs. If the system 100 can identify a sales representative 120 who also demonstrates an interest in dogs, the system 100 may select said sales representative 120 to service the consumer 116. As another example, the photographic data 400 may include an image of the user at a concert. Accordingly, the system 100 may determine that the consumer 116 engaged in said concert activity. Therefore, if the system 100 can identify a sales representative 120 that attended the same or similar concert activity, the system 100 may select said sales representative 120 to service the consumer 116. It is apparent that there may exist a multitude of activities and interests that can be extracted from social network data or other Internet data and utilized by the present invention to match the consumer 116 to a sales representative 120 and/or provide the sales representative 120 with at least one common characteristic from which to establish a rapport. As used herein, the term "activity" is intended to indicate a thing that a person has done and the term "interest" is intended to indicate a subject or topic about which a person is concerned, curious of, or enthusiastic about.

In a further embodiment, the photographic data 400 may include textual communications that may be posted with or otherwise associated with the photograph. For example, the photograph 500 of the consumer's 116 dog may also be posted with the comment "I love my dog." Accordingly, without any analysis of the actual visual content of the photographic image, the system 100 may be able to determine that the subject of the photograph is likely associated with dogs. In this manner, text data can also be considered photographic data 400 that is used to extract information about the visual subject or topic of the photograph.

In one embodiment, textual communications 402 can include text-based posts on the consumer's 116 and sales representative's 120 social network accounts. As is generally known, social network users are able to post text communications 402, which often include opinions, experiences, interests, activities, and other personal information about said users. In another embodiment, textual communications 402 may include, for example, chat content or messaging content between two social network accounts. For example, whereas a post allows a user to publish content to all other users with permission to view the posting user's page or wall, social networks can also include a chat window or messaging section where the user can communicate with one or more specified users (to the exclusion of other users). In yet another embodiment, textual communications 402 can include hashtags posted by the user on his or her social network account. FIG. 5 shows a sales representative's tweet 502: "Picking up my dog from daycare," which tweet may be obtained by the web scrapper 113, and subsequently stored on the database 108. Accordingly, the system 100 may determine that said sales representative 120 likely has an interest in dogs. The system 100 may select said sales representative 120 to service the consumer 116 who posted the photograph 500 of his dog on his Facebook page. In an additional embodiment, the system 100 may also send a message to a mobile electronic device (e.g., smart phone) of the selected sales representative 120 indicating that the consumer 116 has an interest in dogs.

In one embodiment, the video data 404 can include videos with moving images and audio posted on the consumer's 116 and sales representative's 120 social network accounts. In another embodiment, the video data 404 can include meta data associated with the videos, such as, for example, geo-location corresponding to the video, individuals tagged in said video, time and date that said video was taken, and the like. In yet a further embodiment, the video data 404 may include a determination of the topic of the video based on text that may be posted or otherwise associated with the video. As with the photographic data 400 and text communications 402 described above, the video data 404 may be used to extract personal information corresponding to the consumer 116 and the plurality of sales representatives 120 in order to match the consumer 116 with a sales representative 120. In one embodiment, the system 100 may use only current personal information to match the consumer 116 to a sales representative 120, so that outdated personal information does not reduce the relevancy of the data. For example, the system 100 may delete or reduce a relevancy score assigned to data that is, for example, more than two years old (or another predetermined time period).

The "web scrapper" can be considered a software application and/or associated hardware components (e.g., computing device running the software application) that go through the content of a website for the purpose of extracting information from it. In a preferred embodiment, this is performed via web service calls to the server hosting the website. Websites often provide application programming interfaces (APIs) that allow web scrappers to make service calls in order to gather information from the website. For example, Twitter offers APIs that allow web scrappers to obtain various types of user information about a user (e.g., the user's tweets) if the Twitter handle of the user is provided to the API. Many other social network websites also provide such tools to allow web scrappers to gather information from user accounts. Accordingly, the web scrapper 113 can be used to gather information about website users such as, for example, photographs, videos, messages, posts, email addresses, demographic information, and the like, from websites.

In one embodiment, the web scrapper 113 gathers data on the Internet that is associated with the consumer 116 and the plurality of sales representatives 120 in order to populate the database 108 with personal information that is used to identify a sales representative 120 having a commonality with the detected consumer 116. In one embodiment, the web scrapper 113 is configured to systematically and automatically search through Internet web pages and aggregate information from the web pages. In one embodiment, the web scrapper 113 is configured to automatically search the Internet for social network system web pages and content (e.g., text, photographs, video, audio files, etc.). The web scrapper 113 may store the content on the database 108 and/or provide hyperlinks to the Internet content. In a preferred embodiment, the web scrapper 113 gathers user data associated with one or more social network systems on the Internet, such as, for example, Facebook, Twitter, Instagram, Myspace, and the like. In another embodiment, the web scrapper 113 gathers data from the Internet that is stored on personal information sources other than social network systems, such as, for example, public government records or other databases or websites. In one embodiment, the web scrapper 113 continuously searches the Internet for content to provide current, relevant personal information to the system 100.

In one embodiment, data stored on the database 108 and/or collected by the web scrapper 113 may be used to create personality profiles 408 of the consumer 116 and/or the plurality of sales representatives 120. As used herein, the term "personality" is intended to indicate a combination of characteristics or qualities that form an individual's character. In one embodiment, the system 100 gathers data associated with the consumer 116 and the plurality of sales representatives 120 and uses the data to create the personality profile 408 for each said individual. In one embodiment, the personality profile 408 can include said individual's personality traits, such as, for example, frugal, athletic, and optimistic. Accordingly, the system 100 may match the consumer 116 with a sales representative 120 having one or more similar personality traits.

In another embodiment, the database 108 may include demographic data associated with each of the consumer 116 and the plurality of sales representatives 120. The demographic data may include the individual's age, ethnicity, sex, sexual orientation, political affiliation, religion, and the like. The demographic data may be used by the system 100 to identify a sales representative 120 that shares common demographics with the consumer 116.

In step 206, at least one of the plurality of sales representatives 120 is selected to serve the consumer 116 based on the comparison of personal information. In one embodiment, the sales representative 120 is selected by identifying at least one common interest between the consumer 116 and the sales representative 120 (e.g., dogs, nature, fitness, science, certain television shows, bands, etc.). In another embodiment, the sales representative 120 is selected by identifying at least one common activity between the consumer 116 and the sales representative 120 (e.g., attendance at a concert, a festival, a movie, etc.). In yet another embodiment, the sales representative 120 is selected by identifying at least one common demographic between the consumer 116 and the sales representative 120 (e.g., political affiliation, religion, etc.). In yet a further embodiment, the sales representative 120 is selected by identifying similar personality traits within the personality profiles 408 of the consumer 116 and sales representative 120.

In one embodiment, a ranking list is created that ranks how closely the consumer 116 is matched with each of the plurality of sales representatives 120. Accordingly, the system 100 may select the sales representative that most closely matches the consumer 116 according to the ranking list. In one embodiment, each sales representative 120 is ranked according to how many commonalities are shared with the consumer 116. In another embodiment, each sales representative 120 is ranked according to a ranking score that is based on weighted values for each commonality that may be shared with the consumer 116. For example, demographic data may be weighted more than common activity data, and common activity data may be weighted more than common interest data. Further, each said shared commonality is assigned a weighted value and all the weighted values for each sales representative 120 may be added together in order to generate a ranking score for each sales representative. In one embodiment, the sales representative 120 with the highest ranking score in the ranking list is selected to serve the customer 116. In a further embodiment, the system 100 determines whether the selected sales representative 120 is currently available to serve the customer 116. If, for example, the system 100 determines that the selected sales representative 120 is not currently available, the system 100 may select the next most closely matched sales representative 120 that is currently available. In yet a further embodiment, the system 100 may determine whether the selected sales representative 120 is available in the near future to serve the customer 116. If, for example, the system 100 determines that the selected sales representative 120 is available in the future, the system 100 may arrange an appointment with the selected sales representative 120 and the customer 116 at a future time, or may inform another sales representative 120 to direct the customer 116 to a waiting area until the selected sales representative 120 becomes available. The system 100 may estimate a time period within which the selected sales representative 120 may become available and, based on the estimated time period, select a course of action, e.g., select another sales representative 120 or direct the customer 116 to a waiting area.

In step 208, an indication of the consumer 116 is communicated to the selected sales representative 120. As used herein, the "indication" is intended to mean anything that points to, indicates, or otherwise suggests to the sales representative 120 that he or she is selected to serve the customer 116 based on a comparison of personal information of the consumer 116 with his or her own personal information. In one embodiment, the indication is a text message. In another embodiment, the indication is an email. In yet another embodiment, the indication can be another form of electronic communication. In one embodiment, the indication of the detected consumer 116 is communicated to the electronic device 106 associated with the selected sales representative 120, such as a smart phone, personal computer terminal (PC), computer tablet, or the like. In one embodiment, the electronic communication can include a photograph of the consumer 116 captured by, for example, the sensor 104 so that the selected sales representative 120 can more clearly identify the consumer 116.

Figure 6:
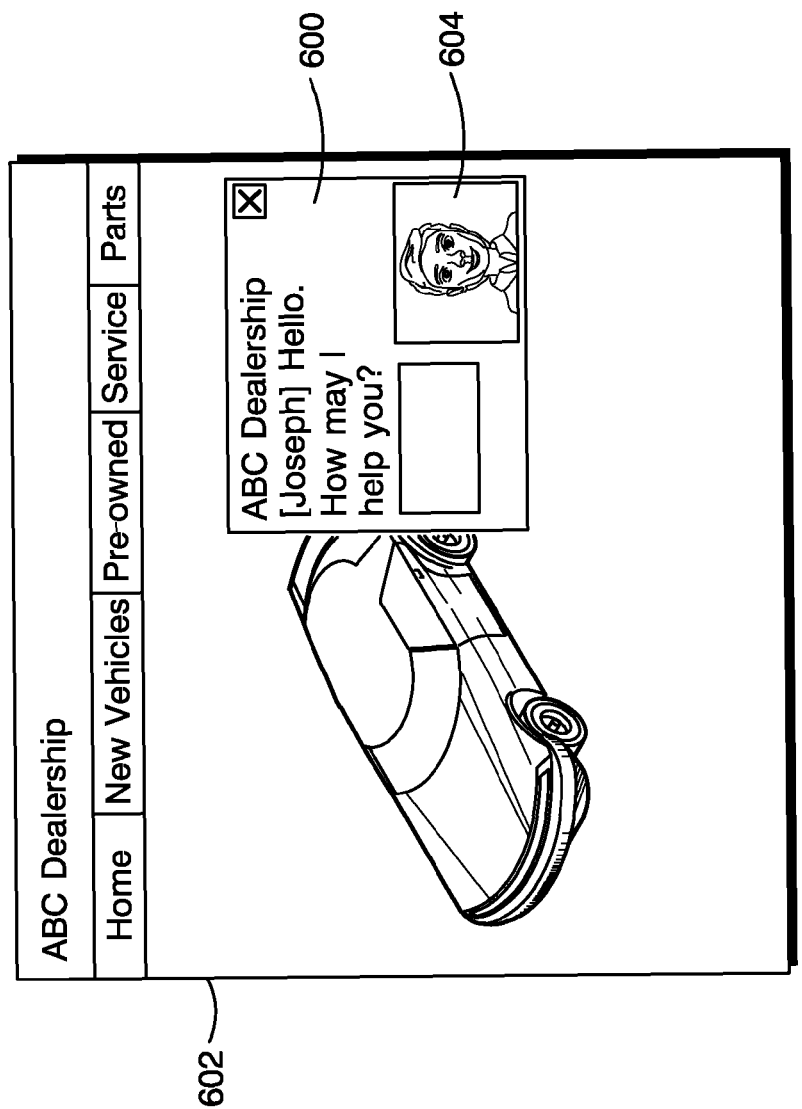
FIG. 6 is a screenshot illustrating an exemplary chat window in accordance with an embodiment of the present invention.

In an embodiment where the retail environment is an e-commerce website, the website server 112 may cause a chat window 600 to be displayed on the web page 602 being viewed by the consumer 116, as illustrated in FIG. 6. As is generally known, a chat window is website component, typically operated by a chat program, which allows two client terminals to communicate over the Internet in real-time, in this case a consumer and a sales representative. Chat windows typically facilitate text communications. In some embodiments of the present invention, the chat window may possess the bandwidth to support larger bandwidth communications, such as video chatting. A respective chat window may also be displayed on the electronic device 106 associated with the selected sales representative 120. The corresponding chat windows 600 of the consumer 116 and sales representative 120 may allow the consumer 116 and the selected sales representative 120 to conduct an Internet-based chat in real-time. In one embodiment, the chat window 600 may include a photograph 604 of the selected sales representative 120. In another embodiment, the personal information of the detected consumer 116 that is in common with the personal information of the selected sales representative 120 may be communicated to the electronic device 106 of the selected sales representative 120, or otherwise shared, so that the sales representative 120 may utilize the personal information to establish a rapport with the consumer 116, or otherwise establish a personal connection therewith. For example, knowing that the consumer 116 has children, the selected sales representative can suggest child-friendly products and/or otherwise relate to having children, as well. Advantageously, personalization of the e-commerce environment can be achieved. The process ends at step 210.

Figure 7:
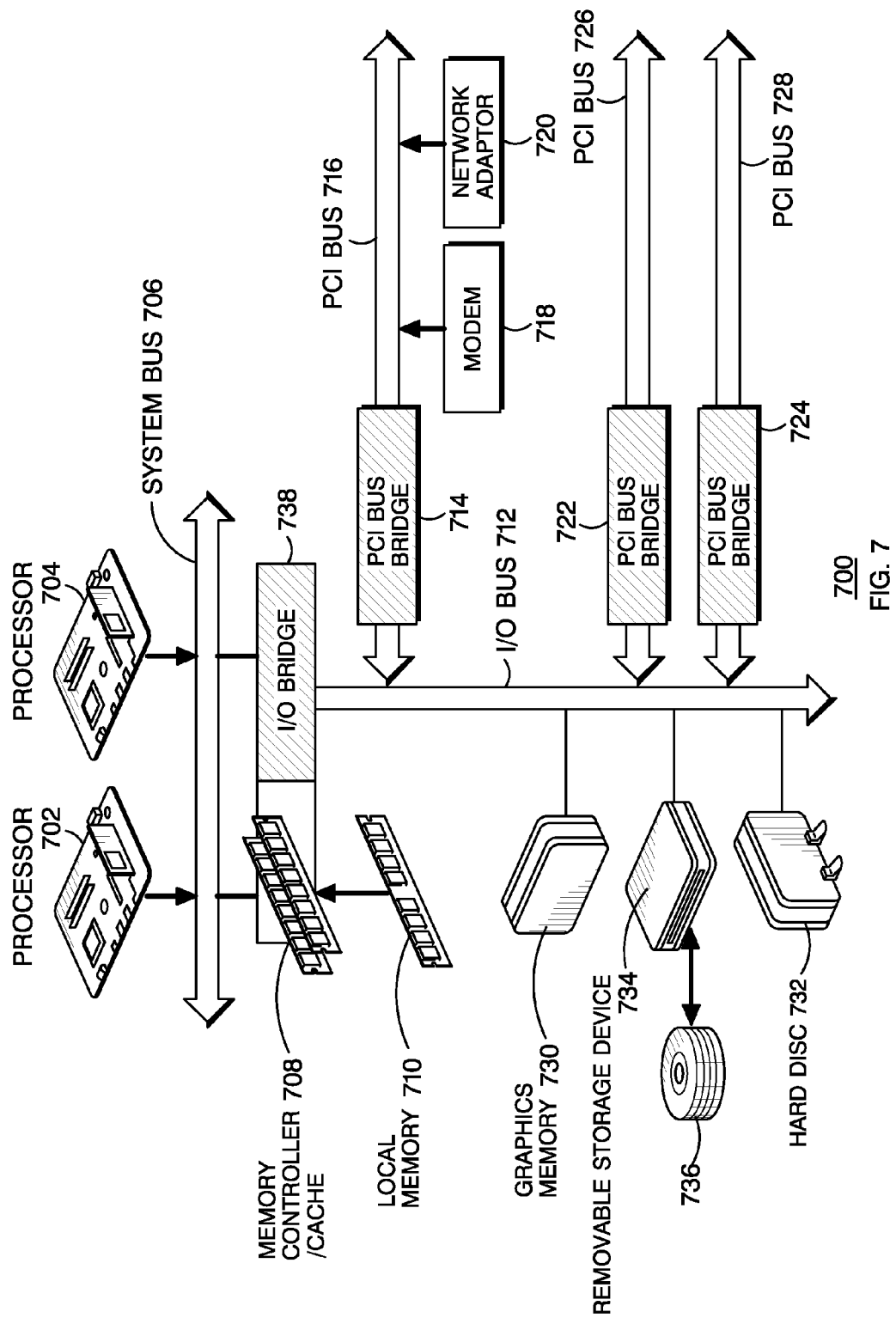
FIG. 7 is a block diagram of a data processing system that may be implemented as a network device, such as a server, in accordance with an embodiment of the present invention.

Referring to FIG. 7, a block diagram is shown of a data processing system 700 that may be implemented as a server, such as the server 110 and/or 112, or implemented as a personal computer, mobile electronic device, or other computing device coupled to the network 114, as shown in FIG. 1, in accordance with one embodiment of the present invention. The data processing system 700 may be a symmetric multiprocessor (SMP) system including a plurality of processors 702 and 704 connected to the system bus 706. Alternatively, a single processor system may be employed. Also, connected to the system bus 706 is memory controller/cache 708, which provides an interface to local memory 710. An I/O bus bridge 738 is connected to the system bus 706 and provides an interface to the I/O bus 712. The memory controller/cache 708 and I/O bus bridge 738 may be integrated as depicted. The processor 702 or 704 in conjunction with the memory controller 708 controls what data is stored in the memory 710. The processor 702 and/or 704 and the memory controller 708 can serve as a data counter for counting the rate of data flow to the memory 710 or from the memory 710 and can also count the total volume of data accessed to or from the memory 710. The processor 702 or 704 can also work in conjunction with any other memory device or storage location.

A peripheral component interconnect (PCI) bus bridge 714 connected to the I/O bus 712 provides an interface to a PCI local bus 716. A number of modems 718, or wireless cards, may be connected to the PCI bus 716. Typical PCI bus implementations will support four PCI expansion slots or add-in connectors. PCI includes, but is not necessarily limited to, PCI-X and PCI Express components. Communications links to the network of computers in FIG. 1 may be provided through the modem 718 and network adapter 720 connected to the PCI local bus 716 through add-in boards.

Additional PCI bus bridges 722 and 724 provide interfaces for additional PCI buses 726 and 728, from which additional modems or network adapters may be supported. In this manner, the data processing system 700 allows connections to a multiple network of computers. A graphics adapter 730 and hard disk 732 may also be connected to the I/O bus 712 as depicted, either directly or indirectly.

Those of ordinary skill in the art will appreciate that the hardware depicted in FIG. 7 may vary. For example, other peripheral devices, such as optical disk drives and the like, also may be used in addition to or in place of the hardware depicted. The depicted example is not meant to imply architectural limitations with respect to the present invention.

The processes explained in detail above can be embodied in a computer program. Computer programs (also called computer control logic) are stored in memory such as main memory 710, removable storage drive 734, removable media 736, hard disk 732, and signals. Such computer programs, when executed, enable the computer system to perform the features of the present invention as discussed herein. In particular, the computer programs, when executed, cause the processor 702 and/or 704 to perform the features of the retail experience enhancing system 100.

In this document, the terms "computer program medium," "computer usable medium," and "computer readable medium" are used to generally refer to media such as main memory 710, removable storage drive 734, removable media 736, hard disk 732, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network that allows a computer to read such computer readable information.

Referring now to FIG. 8, an exemplary electronic mobile device 800, which may be implemented as the electronic device 106 of the sales representative 120 (see FIG. 1), is illustrated in a block diagram view. The exemplary electronic mobile device 800 includes a user input interface 802, a network interface 804, memory 806, a processing device 808, a display 810, an audio input/output 812, and a location detection device 814.

The user input interface 802 functions to provide a user a method of providing input to the electronic mobile device 800. The user input interface 802 may also facilitate interaction between the user and the device 800. The user input interface 802 may be a keypad providing a variety of user input operations. For example, the keypad may include alphanumeric keys for allowing entry of alphanumeric information (e.g. telephone numbers, contact information, text, etc.). The user input interface 802 may include special function keys (e.g. a camera shutter button, volume control buttons, back buttons, home button, etc.), navigation and select keys, a pointing device, and the like. Keys, buttons, and/or keypads may be implemented as a touchscreen associated with the display 810. The touchscreen may also provide output or feedback to the user, such as haptic feedback or orientation adjustments of the keypad according to sensor signals received by motion detectors, such as an accelerometer, located within the device 800.

The network interfaces 804 may include one or more network interface cards (NIC) or a network controller. In some embodiments, the network interface 804 may include a personal area network (PAN) interface. The PAN interface may provide the capability for the electronic mobile device 800 to network using a short-range communication protocol, for example, a Bluetooth communication protocol. The PAN interface may permit one electronic mobile device 800 to connect wirelessly to another electronic mobile device 800 via a peer-to-peer connection.

The network interfaces 804 may also include a local area network (LAN) interface. The LAN interface may be, for example, an interface to a wireless LAN, such as a Wi-Fi network. The range of the LAN interface may generally exceed the range available via the PAN interface. Typically, a connection between two electronic devices via the LAN interface may involve communication through a network router or other intermediary device.

Additionally, the network interfaces 804 may include the capability to connect to a wide area network (WAN) via a WAN interface. The WAN interface may permit a connection to a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

The electronic mobile device 800 may also include a near field communication (NFC) interface. The NFC interface may allow for extremely close range communication at relatively low data rates (e.g., 424 kb/s). The NFC interface may take place via magnetic field induction, allowing the NFC interface to communicate with other NFC interfaces located on other electronic mobile devices 800 or to retrieve information from tags having radio frequency identification (RFID) circuitry. The NFC interface may enable initiation and/or facilitation of data transfer from one electronic mobile device 800 to another electronic device 800 with an extremely close range (e.g. 4 centimeters).

Memory 806 associated with the device 800 may be, for example, one or more buffer, a flash memory, or non-volatile memory, such as random access memory (RAM). The electronic mobile device 800 may also include non-volatile storage. The non-volatile storage may represent any suitable storage medium, such as a hard disk drive or non-volatile memory, such as flash memory.

The processing device 808 can be, for example, a central processing unit (CPU), a microcontroller, or a microprocessing device, including a "general purpose" microprocessing device or a special purpose microprocessing device. The processing device 808 executes code stored in memory 806 in order to carry out operation/instructions of the electronic mobile device 800. The processing device 808 may provide the processing capability to execute an operating system, run various applications, and provide processing for one or more of the techniques described herein.

The display 810 displays information to the user such as an operating state, time, telephone numbers, various menus, application icons, pull-down menus, and the like. The display 810 may be used to present various images, text, graphics, or videos to the user, such as photographs, mobile television content, Internet webpages, and mobile application interfaces. In one embodiment, the display 810 is used to present the indication of the consumer 116 to the electronic device 106 of the selected sales representative 120 (see FIG. 1). In another embodiment, the display 810 presents text communications of the commonality between the consumer 116 and the selected sales representative 120. The display 810 may be any type of suitable display, such as an liquid-crystal display (LCD), a plasma display, a light-emitting diode (LED) display, or the like.

The electronic mobile device 800 may include audio input and output structures 812, such as a microphone for receiving audio signals from a user and/or a speaker for outputting audio data, such as audio alerts, songs, ringtones, video tracks, voice data received by the electronic mobile device 800 over a cellular network, and the like. The electronic mobile device 800 may also include an audio port for connection to peripheral audio input and output structures, such as a headset, or peripheral speakers or microphones.

The location detection device 814 may be associated with a global positioning system (GPS) or other location sensing technologies. The electronic mobile device 800 may have a GPS receiver or the like, to determine the location of the electronic mobile device 800.

A novel and efficient system and method of matching a consumer with a sales representative has been disclosed that provides a system with a sensor that detects the presence of a consumer within a retail environment, such as a brick-and-mortar establishment or an e-commerce website. In addition, a web scrapper searches social network systems for personal information of consumers and sales representatives. The personal information is stored on a database and includes text communications, photographs, video, and other related data or meta data. A processing device compares the personal information of the consumer with the personal information of each of a plurality of sales representatives employed by the brick-and-mortar retail establishment and selects the sales representative with at least one common interest, activity, characteristic, experience, personality trait, or the like. Accordingly, personal data from social networks can be utilized by brick-and-mortar establishments to select a sales representative that is compatible with a particular consumer and will therefore be able to better assist the consumer.

What is claimed is:

1. A computer-implemented method of matching a consumer with a sales representative, the method comprising steps of:

detecting, by at least one sensor of a computing system, a presence of a consumer at a brick-and-mortar retail establishment, the at least one sensor including a camera, the camera physically present at the brick-and-mortar retail establishment, the at least one sensor operably configured to receive visual images captured by the camera;

in response to receiving the visual images captured by the camera, at least one processor of the computing system comparing the visual image of the consumer to images retrieved from at least one remote social network server to identify the consumer physically present at the brick-and-mortar retail establishment;

in response to identifying the consumer, at least one processor of the computing system automatically comparing personal information of the identified consumer with personal information of a plurality of sales representatives employed by the brick-and-mortar retail establishment, the personal information of the identified consumer and the personal information of the plurality of sales representatives stored on at least one database communicatively coupled to the computing system and including at least one of: text data determined from an analysis of text communications retrieved from at least one remote social network server, photographic data determined from an analysis of photographs retrieved from at least one remote social network server, video data determined from an analysis of videos retrieved from at least one remote social network server, and combinations thereof; and in response to comparing the personal information of the identified consumer and the personal information of the plurality of sales representatives, at least one processor of the computing system selecting one of the plurality of sales representatives that has personal information in common with the personal information of the identified consumer;

in response to selecting one of the plurality of sales representatives, automatically communicating, via at least one network connection of the computing system, to an electronic device associated with the selected sales representative, an indication of selection to service the identified consumer, an image of the identified consumer, and the personal information of the identified consumer that is in common with the personal information of the selected sales representative.

2. The method in accordance with claim 1, further comprising the step of:

creating a personality profile based on the personal information retrieved from the at least one remote social network server.

3. The method in accordance with claim 1, further comprising the steps of:

analyzing, by at least one processor of the computing system, the photographic data of the identified consumer and determining at least one of an interest and an activity of the identified consumer from the photographic data;

analyzing, by at least on processor of the computing system, the photographic data of the plurality of sales representatives and determining at least one of an interest and an activity of the plurality of sales representatives from the photographic data; and performing, by at least one processor of the computing system, the selecting step by identifying at least one common interest or common activity between the identified consumer and at least one of the plurality of sales representatives.

4. The method in accordance with claim 1, further comprising the steps of:

analyzing, by at least one processor of the computing system, the video data of the identified consumer and determining at least one of an interest or activity of the identified consumer from the video data;

analyzing, by at least one processor of the computing system, the video data of the plurality of sales representatives and determining at least one of an interest or activity of the plurality of sales representatives from the video data; and performing, by at least one processor of the computing system, the selecting step by identifying at least one common interest or common activity between the identified consumer and at least one of the plurality of sales representatives.

5. The method in accordance with claim 1, further comprising the steps of:

analyzing, by at least one processor of the computing system, the text data of the identified consumer and determining at least one of an interest or an activity of the identified consumer from the text data;

analyzing, by at least one processor of the computing system, the text data of the plurality of sales representatives and determining at least one of an interest or an activity of the plurality of sales representatives from the text data; and performing, by at least one processor of the computing system, the selecting step by identifying at least one common interest or common activity between the identified consumer and at least one of the plurality of sales representatives.

6. The method in accordance with claim 1, wherein:

the personal information stored on the at least one database includes demographics of the identified consumer and the plurality of sales representatives.

7. The method in accordance with claim 1, further comprising steps of:

based on the analysis of the personal information of the identified consumer stored on the at least one database, at least one processor of the computing system determining at least one of an interest or activity of the identified consumer from said personal information;

based on the analysis of the personal information of the plurality of sales representatives stored on the at least one database, at least one processor of the computing system determining at least one of an interest or activity of each of the plurality of sales representatives from said personal information;

identifying, by at least one processor of the computing system, at least one common interest or common activity between the identified consumer and at least one of the plurality of sales representatives; and creating a ranking list, by the at least one processor, the ranking list ranking each of the plurality of sales representatives based on the identification of the at least one common interest or common activity between the identified consumer and the plurality of sales representatives; and selecting, by at least one processor of the computing system, a highest ranking sales representative from the ranking list to serve the identified consumer.

8. The method in accordance with claim 1, further comprising the steps of:

retrieving, by a web scraper, text communications, photographs and videos associated with the identified consumer and the plurality of sales representatives and populating the at least one database with the retrieved text communications, photographs and videos, wherein the text communications, photographs and videos are retrieved from at least one remote social network server and corresponds to the personal information of the identified consumer and the plurality of sales representatives that is used to select the one of the plurality of sales representatives to serve the identified consumer.

* * * * *